United States Patent
Bonja

(10) Patent No.: US 12,113,837 B2
(45) Date of Patent: Oct. 8, 2024

(54) INTERACTIVE CALLING FOR INTERNET-OF-THINGS

(71) Applicant: Telefonaktiebolaget LM Ericsson (publ), Stockholm (SE)

(72) Inventor: Mario Bonja, Mirabel (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/250,433

(22) PCT Filed: Oct. 26, 2020

(86) PCT No.: PCT/IB2020/060035
§ 371 (c)(1),
(2) Date: Apr. 25, 2023

(87) PCT Pub. No.: WO2022/090763
PCT Pub. Date: May 5, 2022

(65) Prior Publication Data
US 2024/0007509 A1  Jan. 4, 2024

(51) Int. Cl.
*H04L 12/70* (2013.01)
*H04L 41/0806* (2022.01)
*H04L 65/1069* (2022.01)
*H04L 65/1073* (2022.01)
*H04L 67/12* (2022.01)
*H04L 67/125* (2022.01)
(Continued)

(52) U.S. Cl.
CPC ...... *H04L 65/1073* (2013.01); *H04L 65/1069* (2013.01); *H04L 67/125* (2013.01); *H04W 4/70* (2018.02)

(58) Field of Classification Search
CPC ............ H04L 65/1073; H04L 65/1069; H04L 67/125; H04W 4/70
USPC ....................................................... 709/229
See application file for complete search history.

(56) References Cited

U.S. PATENT DOCUMENTS

| | | |
|---|---|---|
| 8,121,274 B2 | 2/2012 | Brown et al. |
| 8,462,798 B2 | 6/2013 | Rotsten et al. |
| 8,478,890 B2 | 7/2013 | Chaturvedi et al. |

(Continued)

FOREIGN PATENT DOCUMENTS

WO    2014/179480 A2    11/2014

OTHER PUBLICATIONS

International Search Report and Written Opinion dated Aug. 30, 2021 issued in PCT Application No. PCT/IB2020/060035 filed Oct. 26, 2020, consisting of 20 pages.

(Continued)

*Primary Examiner* — El Hadji M Sall
*Assistant Examiner* — Elizabeth Kassa
(74) *Attorney, Agent, or Firm* — Weisberg I.P. Law, P.A.

(57) ABSTRACT

Apparatuses and methods for Interactive calling for IoT. In one embodiment, a wireless device is configured to register, by a first Session Initiation Protocol, SIP, client, with an Internet Protocol, IP, Multimedia communication Subsystem, IMS, network and waiting for incoming SIP calls; answer, by the first SIP client, an incoming SIP call from at least one authorized second SIP client associated with an Internet-of-Things, IoT, application; and after answering the incoming SIP call, negotiate an IMS data channel for a plurality of predetermined endpoints associated with the IoT application.

19 Claims, 8 Drawing Sheets

(51) Int. Cl.
*H04W 4/70* (2018.01)
*H04W 48/08* (2009.01)

(56) References Cited

U.S. PATENT DOCUMENTS

| | | | |
|---|---|---|---|
| 9,172,486 | B2 | 10/2015 | Sambhwani et al. |
| 9,736,721 | B2 | 8/2017 | Laroia et al. |
| 2002/0107966 | A1* | 8/2002 | Baudot .................. H04L 69/40 |
| | | | 709/227 |
| 2006/0155814 | A1* | 7/2006 | Bennett ............... H04L 65/1101 |
| | | | 709/227 |
| 2008/0259865 | A1* | 10/2008 | Hurtta ................... H04L 47/824 |
| | | | 370/329 |
| 2015/0264689 | A1 | 9/2015 | Sampath et al. |
| 2017/0026927 | A1* | 1/2017 | Siegel ................. H04L 65/1095 |
| 2017/0041752 | A1* | 2/2017 | Baek ....................... H04W 4/06 |
| 2017/0359237 | A1 | 12/2017 | Hao et al. |
| 2019/0312916 | A1* | 10/2019 | Siddappa ............ H04L 65/1073 |
| 2020/0195732 | A1* | 6/2020 | Draznin .................. H04L 67/51 |
| 2020/0280511 | A1* | 9/2020 | Gapin .................. H04L 67/141 |
| 2020/0389775 | A1* | 12/2020 | Ravichandran ....... H04W 8/183 |

OTHER PUBLICATIONS

Invitation to Pay Additional Fees and, Where Applicable, Protest Fee dated Jul. 7, 2021 issued in PCT Application No. PCT/IB2020/060035 filed Oct. 26, 2020, consisting of 12 pages.
Karaagac Abdulkadir et al., VIoT: Voice Over Internet of Things; Jun. 3, 2020 Global Internet of Things Summit (GIOTS), consisting of 6 pages.

* cited by examiner

INTERACTIVE CALLING FOR INTERNET-OF-THINGS

CROSS-REFERENCE TO RELATED APPLICATIONS

This application is a Submission Under 35 U.S.C. § 371 for U.S. National Stage Patent Application of International Application Number: PCT/IB2020/060035, filed Oct. 26, 2020 entitled "INTERACTIVE CALLING FOR INTERNET-OF-THINGS," the entirety of which is incorporated herein by reference.

TECHNICAL FIELD

Wireless communication and in particular, methods and apparatuses for Interactive calling for Internet-of-Things (IoT).

BACKGROUND

There is a proliferation of IoT devices with real-time communications capabilities connected to mobile networks, such as Third Generation Partnership Project (3GPP) $5^{th}$ Generation (5G, also called New Radio or NR). However, existing solutions for accessing such IoT devices in a secure manner is becoming a common concern.

Accessing IoT devices on demand, especially when connected to a mobile network in a secure manner, may require significant infrastructure. For example, a server must generally be present, the IoT device must always be connected to that server, the server and the connection it uses must be secured, etc. This is similar to devices like smart network connected thermostats, for example. They automatically connect to a server on the Internet through a residential home's Wi-Fi network. A software application running on a user's wireless device (WD), such as a smart phone or tablet, also connects to this server allowing the WD to supervise and control the thermostat. This server (or cluster of servers) must be engineered to support a large number of devices (e.g., Nest thermostats, IoT devices, etc.) and users (i.e., WDs) while providing acceptable performance.

SUMMARY

Some embodiments advantageously provide methods and apparatuses for Interactive calling for Internet-of-Things (IoT).

According to an aspect of the present disclosure, a method implemented in a wireless device is provided. The method includes registering, by a first Session Initiation Protocol, SIP, client, with an Internet Protocol, IP, Multimedia communication Subsystem, IMS, network and waiting for incoming SIP calls; answering, by the first SIP client, an incoming SIP call from at least one authorized second SIP client associated with an Internet-of-Things, IoT, application; and after answering the incoming SIP call, negotiating an IMS data channel for a plurality of predetermined endpoints associated with the IoT application.

In some embodiments of this aspect, the method further includes creating a local endpoint at the wireless device for at least one of the plurality of predetermined endpoints associated with the IoT application; and after establishing the IMS data channel, using the local endpoint at the wireless device to exchange data over the IMS data channel. In some embodiments of this aspect, the local endpoint is one of a local identification-based network endpoint and a local publish-subscribe endpoint. In some embodiments of this aspect, the method includes sending incoming data from the local endpoint at the wireless device to the IMS data channel. In some embodiments of this aspect, the method further includes using one of an identification and publish-subscribe topic associated with the local endpoint to determine a subchannel corresponding to the IMS data channel; and sending the incoming data from the local endpoint comprises sending the incoming data from the local endpoint to the determined subchannel.

In some embodiments of this aspect, the method further includes sending incoming data from the IMS data channel to the local endpoint at the wireless device. In some embodiments of this aspect, the method further includes using one of an identification and a publish-subscribe topic associated with the local endpoint to determine a subchannel corresponding to the IMS data channel; and sending the incoming data from the IMS data channel to the local endpoint comprises sending the incoming data from the determined subchannel to the local endpoint. In some embodiments of this aspect, the method further includes during the SIP call, listening for at least one control command from an endpoint associated with the second SIP client through the IMS data channel. In some embodiments of this aspect, the method further includes dynamically adding at least one temporary endpoint involving re-negotiation of the IMS data channel.

In some embodiments of this aspect, the method further includes dynamically subtracting at least one temporary endpoint involving re-negotiation of the IMS data channel. In some embodiments of this aspect, the method further includes replicating a stream connection state from the remote endpoint. In some embodiments of this aspect, the method further includes exchanging at least one of a current operation status and operational statistics over the IMS data channel with the second SIP client. In some embodiments of this aspect, the plurality of predetermined endpoints comprises at least one of a transmission control protocol, TCP, endpoint, a user datagram protocol, UDP, endpoint and a WebSocket endpoint. In some embodiments of this aspect, each of the plurality of predetermined endpoints corresponds to a subsystem associated with the wireless device.

In some embodiments of this aspect, a session description protocol, SDP, associated with the SIP call includes a media line indicating application. In some embodiments of this aspect, the method further includes determining a Quality-of-Service, QoS, associated with each endpoint of the plurality of predetermined endpoints; and using the determined QoS to negotiate and/or establish the IMS data channel. In some embodiments of this aspect, the method further includes multiplexing data from a plurality of local endpoints at the wireless device and sending the multiplexed data over the IMS data channel. In some embodiments of this aspect, the method further includes receiving multiplexed data from the IMS data channel, demultiplexing the received data and sending the demultiplexed data to a plurality of local endpoints at the wireless device. In some embodiments of this aspect, the wireless device is an Internet-of-Things, IoT, device.

According to another aspect of the present disclosure, a wireless device includes processing circuitry. The processing circuitry is configured to cause the wireless device to: register, by a first Session Initiation Protocol, SIP, client, with an Internet Protocol, IP, Multimedia communication Subsystem, IMS, network and wait for incoming SIP calls; answer, by the first SIP client, an incoming SIP call from at least one authorized second SIP client associated with an Internet-of-Things, IoT, application; and after answering the incoming SIP call, negotiate an IMS data channel for a plurality of predetermined endpoints associated with the IoT application.

In some embodiments of this aspect, the processing circuitry is configured to cause the wireless device to: create a local endpoint at the wireless device for at least one of the plurality of predetermined endpoints associated with the IoT application; and after the IMS data channel is established, use the local endpoint at the wireless device to exchange data over the IMS data channel. In some embodiments of this aspect, the local endpoint is one of a local identification-based network endpoint and a local publish-subscribe endpoint. In some embodiments of this aspect, the processing circuitry is configured to cause the wireless device to send incoming data from the local endpoint at the wireless device to the IMS data channel. In some embodiments of this aspect, the processing circuitry is configured to cause the wireless device to use one of an identification and publish-subscribe topic associated with the local endpoint to determine a subchannel corresponding to the IMS data channel; and send the incoming data from the local endpoint by being configured to cause the wireless device to send the incoming data from the local endpoint to the determined subchannel.

In some embodiments of this aspect, the processing circuitry is further configured to cause the wireless device to send the incoming data from the IMS data channel to the local endpoint at the wireless device. In some embodiments of this aspect, the processing circuitry is configured to cause the wireless device to: use one of an identification and a publish-subscribe topic associated with the local endpoint to determine a subchannel corresponding to the IMS data channel; and send the incoming data from the IMS data channel to the local endpoint by being configured to cause the wireless device to send the incoming data from the determined subchannel to the local endpoint.

In some embodiments of this aspect, the processing circuitry is configured to cause the wireless device to during the SIP call, listen for at least one control command from an endpoint associated with the second SIP client through the IMS data channel. In some embodiments of this aspect, the processing circuitry is configured to cause the wireless device to dynamically add at least one temporary endpoint involving re-negotiation of the IMS data channel. In some embodiments of this aspect, the processing circuitry is configured to cause the wireless device to dynamically subtract at least one temporary endpoint involving re-negotiation of the IMS data channel. In some embodiments of this aspect, the processing circuitry is configured to cause the wireless device to replicate a stream connection state from the remote endpoint. In some embodiments of this aspect, the processing circuitry is configured to cause the wireless device to exchange at least one of a current operation status and operational statistics over the IMS data channel with the second SIP client.

In some embodiments of this aspect, the plurality of predetermined endpoints comprises at least one of a transmission control protocol, TCP, endpoint, a user datagram protocol, UDP, endpoint and a WebSocket endpoint. In some embodiments of this aspect, each of the plurality of predetermined endpoints corresponds to a subsystem associated with the wireless device. In some embodiments of this aspect, a session description protocol, SDP, associated with the SIP call includes a media line indicating application. In some embodiments of this aspect, the processing circuitry is further configured to cause the wireless device to determine a Quality-of-Service, QoS, associated with each endpoint of the plurality of predetermined endpoints; and use the determined QoS to negotiate and/or establish the IMS data channel.

In some embodiments of this aspect, the processing circuitry is configured to cause the wireless device to multiplex data from a plurality of local endpoints at the wireless device and send the multiplexed data over the IMS data channel. In some embodiments of this aspect, the processing circuitry is configured to cause the wireless device to receive multiplexed data from the IMS data channel, demultiplex the received data and send the demultiplexed data to a plurality of local endpoints at the wireless device. In some embodiments of this aspect, the wireless device is an Internet-of-Things, IoT, device.

According to yet another aspect of the present disclosure, a storage medium storing an executable computer program comprising computer instructions executable by at least one processor to perform any of the methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
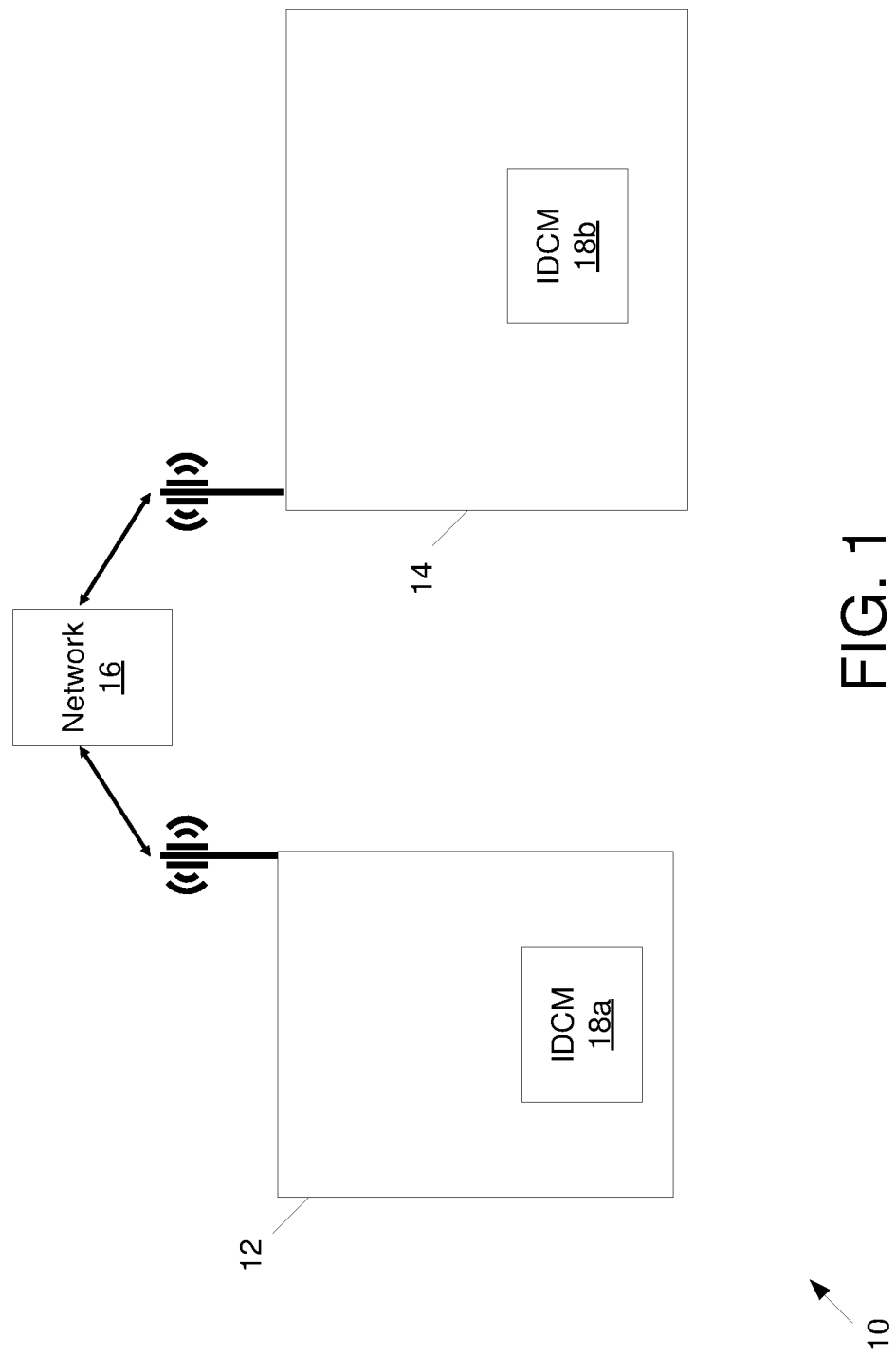
FIG. 1 illustrates an example system architecture according to some embodiments of the present disclosure.

Some embodiments of the present disclosure may allow an authorized user device (e.g., WD) to securely call another device (e.g., IoT device) connected to a mobile network (e.g., 5G) and interact with it remotely.

Some embodiments of the present disclosure may use currently available mobile telephony and may allow an IoT device capable of real-time communications connected to a mobile network to wait dormant for incoming connections. In other words, the IoT device can register to its IMS network and then standby/wait and be ready to receive incoming SIP calls. In some embodiments, this aspect of waiting and being ready to receive any incoming SIP calls may allow the real-time communications to be utilized, levering SIP and IMS to provide a more efficient IoT secure communications feature, as compared to existing arrangements. Some embodiments of the present disclosure may allow for the IoT device to be always reachable by authorized user devices (e.g., WDs).

In some embodiments, the security aspects are not handled by the IoT device itself. The IP Multimedia Subsystem (hereinafter IMS) enables operators of a Public Land Mobile Network (hereinafter PLMN) to provide their subscribers with multimedia services based and built on Internet applications, services and protocols. In some embodiments, rather than relying on dedicated servers, as described above, the IMS infrastructure's advanced security feature may be reused to allow devices with low computing resources (e.g., IoT devices) to benefit from it. As long as the device is registered to the IMS it may be always reachable by authorized user WDs (e.g., smart phones). Some embodiments of the proposed solution may include software that handles the connectivity requirements end-to-end, which may thereby allow IoT application designers to focus on the actual application development, rather than, for example, expending a large amount of time and resources to provide dedicated servers and communication security features.

Some embodiments may provide an IMS data channel manager (IDCM) for IoT devices. In some embodiments, there is provided a standby IoT device that is registered on an IMS with a valid SIP address. The entity that takes control of the device (e.g., user WD) may also be registered on the IMS with its own valid SIP address. To use the IoT device, the controlling entity (e.g., user WD) calls the IoT device and when the call is established, an arbitrary set of network connections are established allowing full control and monitoring of the IoT device. Some embodiments use a new IDCM data channel functionality (also called Interactive Calling) to establish a secure and reliable data connection between the two SIP endpoints.

Before describing in detail exemplary embodiments, it is noted that the embodiments reside primarily in combinations of apparatus components and processing steps related to Interactive calling for IoT. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The WD herein can be any type of wireless device capable of communicating with a network node or another WD over radio signals. In some embodiments, the WD may be an IoT device configured to communicate via IMS. In some embodiments, the WD may be a user device, such as a smart phone. The WD herein can by any type of communication device capable of communicating with another WD, a cloud application server, a network node, an IMS network function (NF) or other IMS network node to e.g., register to IMS, via a wired connection and/or a wireless connection. The WD may also be a radio communication device, target device, device to device (D2D) WD, machine type WD or WD capable of machine to machine communication (M2M), low-cost and/or low-complexity WD, a sensor equipped with WD, Tablet, mobile terminals, laptop embedded equipped (LEE), laptop mounted equipment (LME), USB dongles, Customer Premises Equipment (CPE), an Internet of Things (IoT) device, or a Narrowband IoT (NB-IOT) device, etc.

Although one or more of the examples described in the present disclosure may describe an IoT device receiving a call, it should be understood that, in some embodiments, the IoT device may also initiate a call when an event occurs to, for example, notify a user WD about the event.

Also, although one or more of the examples described in the present disclosure may describe use of SIP clients, it should be understood that one or both (or all) of the ends of an IMS call may be via any user agent (UA). For example, the IMS network may allow the use of a network-to-network interface (NNI) (e.g., web communication gateway (WCG)). The NNI may then be considered to represent the end point via a UA (user agent) and translate/map the end point protocol (e.g., hypertext transfer protocol (HTTP)) to IMS (e.g., SIP) protocols. Thus, the term "SIP client" as used herein may be used to indicate any user agent that may act directly as a SIP client as well as any other type of user agent that can represent one or more endpoints and allow or facilitate translation/mapping to IMS protocols (e.g., SIP) to implement the IMS call described herein.

In some embodiments, the term "local endpoints" is used, where "local" is from the perspective of the IDCM itself, e.g., the endpoint is local to the IDCM. For example, when running on an IoT device, the "local endpoint," such as control of the propellers, may be contrasted to a "remote" endpoint located on the user's side such as the user's joystick.

In some embodiments, the shortened term "call" is used to indicate a SIP call.

The term "IDCM" may stand for IMS Data Channel Manager and may include the SIP client described in the present disclosure.

The term "IoT" or Internet of Things may be used to indicate a device including, or otherwise associated with one or more sensors/devices/peripherals (e.g., actuators, motors, sensors) that may use the IDCM to implement data exchange with one or more remote devices (e.g., running a user application) e.g., that allows the IoT device be remotely controlled.

Note that although terminology from one particular wireless system, such as, for example, a wireless system associated with 3rd Generation Partnership Project (3GPP) standard, such as for example Long Term Evolution (LTE) or 5$^{th}$ Generation (5G) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB), 3GPP2/CDMA and Global System for Mobile Communications (GSM), may also benefit from exploiting the ideas covered within this disclosure.

Note further, that functions described herein as being performed by a WD and/or an IoT device, described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 is a schematic diagram of the communication system 10, according to another embodiment, constructed in accordance with the principles of the present disclosure. The communication system 10 in FIG. 1 is a non-limiting example and other embodiments of the present disclosure may be implemented by one or more other systems and/or networks. Referring to FIG. 1, system 10 includes a WD that is an IoT device 12 and a user WD 14 in communication with one another over a network 16. The network 16 may include a mobile network. For example, the mobile network may include a radio access network (RAN), such as 5G RAN as well as the 5G core. In some embodiments, the network 16 may include or be connected/connectable to the IMS network. In some embodiments, the network 16 may include or be connected/connectable to the Internet. Each of the IoT device 12 and the user WD 14 may include an IMS data channel manager (IDCM) 18a and 18b, respectively. The IoT device 12, such as via IDCM 18a, may be configured to communicate over the RAN in order to register to the IMS network and communicate over the IMS network with the user WD 14 (via the IDCM 18b at the user WD 14).

In some embodiments, the IDCM 18 may be configured to allow an IoT device 12 capable of real-time communications connected to a mobile network to wait dormant for incoming connections/calls and thereby may allow for the IoT device 12 to be always reachable by authorized user WDs 14. In some embodiments, this may avoid the need for a dedicated server to provide secure real-time communications between an IoT device 12 and a user WD 14 on which an IoT application may be running to control/monitor the IoT device. Instead, in some embodiments, the IoT device 12 may merely register to an IMS network and then standby/wait and be ready to receive any incoming SIP calls from authorized users. In some embodiments, this aspect of waiting and being ready to receive any incoming SIP calls may allow the real-time communications to be utilized, leveraging SIP, IMS and mobile networks to provide a more efficient IoT secure communications feature, as compared to existing arrangements.

In some embodiments, the user WD 14 may be considered a controlling entity of the IoT device 12. On each device, resides an IMS Data Channel Manager (IDCM) that contains a respective SIP client and/or information indicating the IMS network that the respective IDCM is registered to.

Example implementations, in accordance with an embodiment, of IoT device 12 and user WD 14 discussed in the preceding paragraphs will now be described with reference to FIG. 2.

The IoT device 12 includes a communication interface 20, processing circuitry 22, and memory 24. The communication interface 20 may be configured to communicate with the WD 14 and/or other elements in the system 10. In some embodiments, the communication interface 20 may be formed as or may include, for example, one or more radio frequency (RF) transmitters, one or more RF receivers, and/or one or more RF transceivers, and/or may be considered a radio interface. In some embodiments, the communication interface 20 may also include a wired interface.

The processing circuitry 22 may include one or more processors 26 and memory, such as, the memory 24. In particular, in addition to a traditional processor and memory, the processing circuitry 22 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 26 may be configured to access (e.g., write to and/or read from) the memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the IoT device 12 may further include software stored internally in, for example, memory 24, or stored in external memory (e.g., database) accessible by the IoT device 12 via an external connection. The software may be executable by the processing circuitry 22. The processing circuitry 22 may be configured to control any of the methods and/or processes described herein and/or to cause such methods, and/or processes to be performed, e.g., by the IoT device 12. The memory 24 is configured to store data, programmatic software code and/or other information described herein. In some embodiments, the software may include instructions stored in memory 24 that, when executed by the processor 26 and/or IDCM 18a, causes the processing circuitry 22 and/or configures the IoT device 12 to perform the processes described herein with respect to the IoT device 12.

The WD 14 includes a communication interface 28, processing circuitry 30, and memory 32. The communication interface 28 may be configured to communicate with the IoT device 12 and/or other elements in the system 10. In some embodiments, the communication interface 28 may be formed as or may include, for example, one or more radio frequency (RF) transmitters, one or more RF receivers, and/or one or more RF transceivers, and/or may be considered a radio interface. In some embodiments, the communication interface 28 may also include a wired interface.

The processing circuitry 30 may include one or more processors 34 and memory, such as, the memory 32. In particular, in addition to a traditional processor and memory, the processing circuitry 30 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 14 may further include software stored internally in, for example, memory 32, or stored in external memory (e.g., database) accessible by the WD 14 via an external connection. The software may be executable by the processing circuitry 30. The processing circuitry 30 may be configured to control any of the methods and/or processes described herein and/or to cause such methods, and/or processes to be performed, e.g., by the WD 14. The memory 32 is configured to store data, programmatic software code and/or other information described herein. In some embodiments, the software may include instructions stored in memory 32 that, when executed by the processor 34 and/or IDCM 18b, causes the processing circuitry 30 and/or configures the WD 14 to perform the processes described herein with respect to the WD 14.

Figure 2:
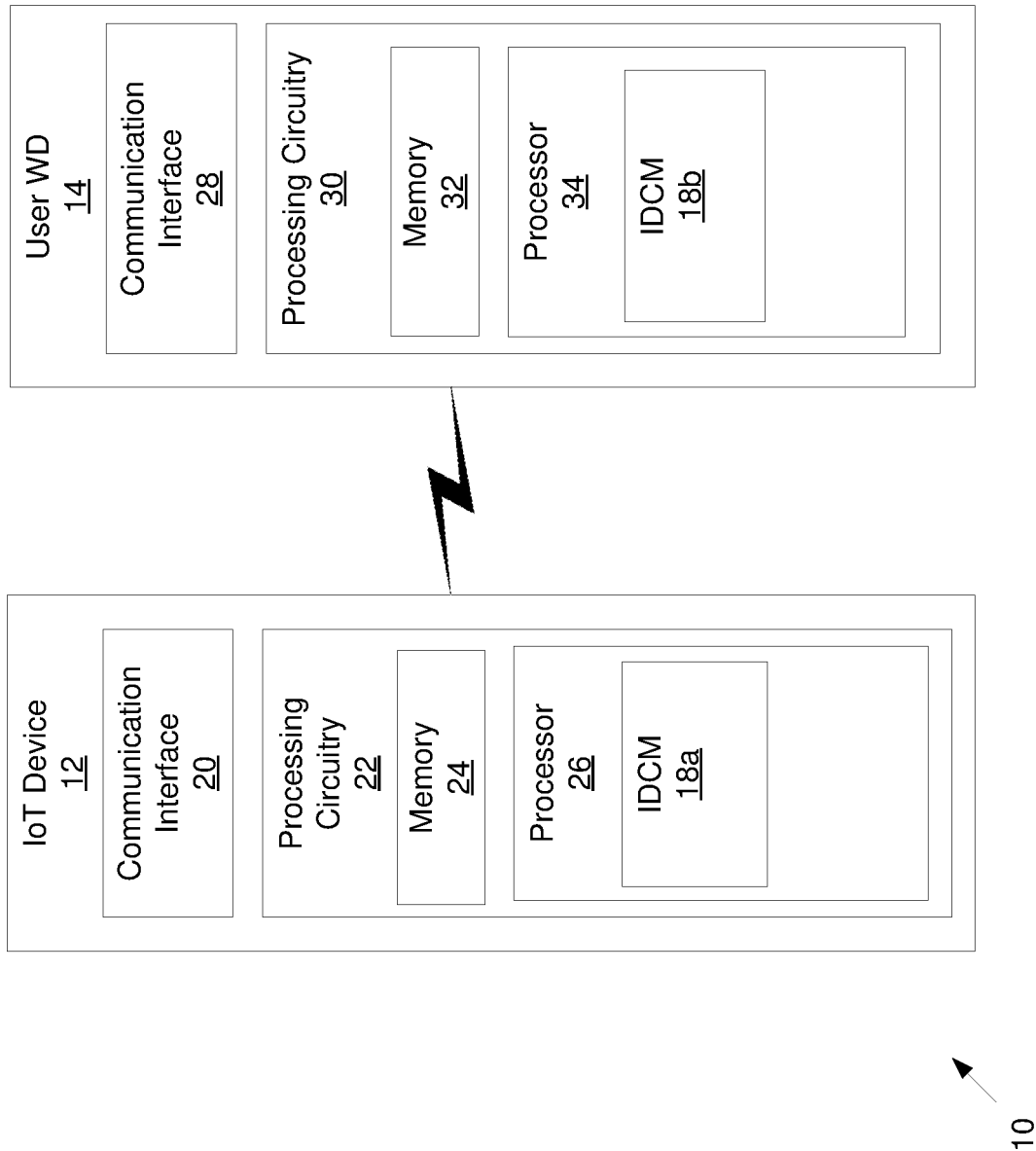
FIG. 2 illustrates another example system architecture and example hardware arrangements for devices in the system according to some embodiments of the present disclosure.

In FIG. 2, the connection between the devices WD 14 and IoT device 12 is shown without explicit reference to any intermediary devices or connections. However, it should be understood that intermediary devices and/or connections may exist between these devices, although not explicitly shown.

Although FIG. 2 shows IDCM 18a and 18b, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 3:
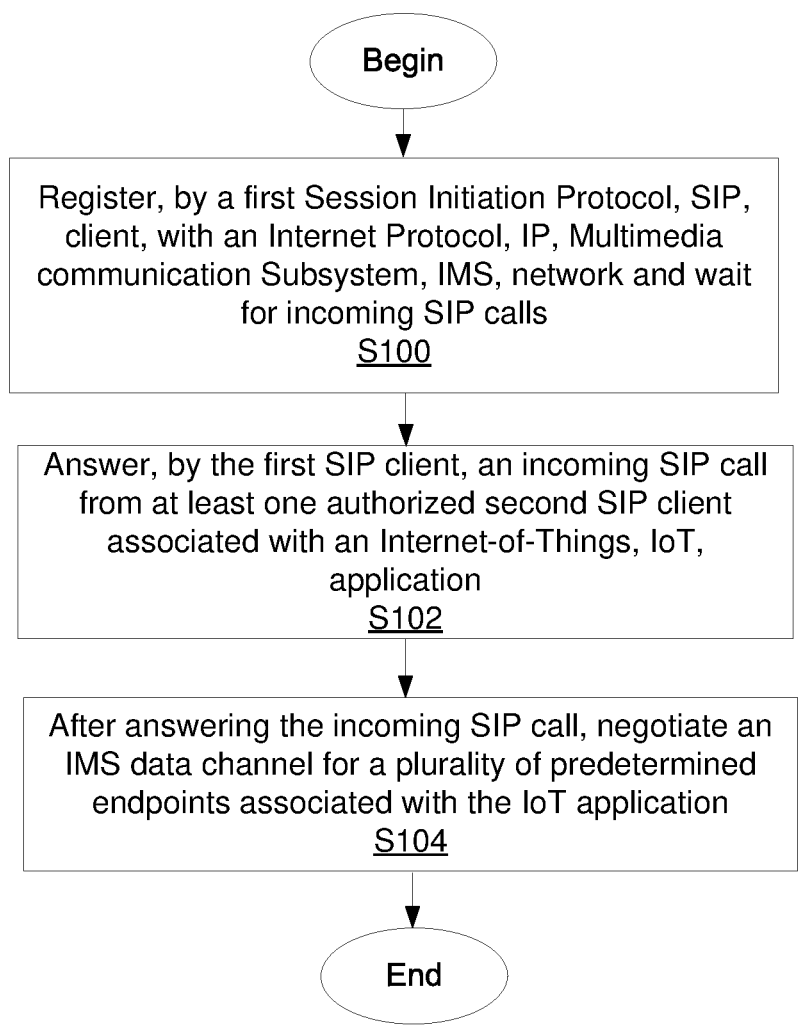
FIG. 3 is a flowchart of an exemplary process implemented by an IDCM at an IoT device and/or user WD according to some embodiments of the present disclosure.

FIG. 3 is a flowchart of an exemplary process in a wireless device, such as IoT device 12 and/or user WD 14 implementing one or more techniques according to some embodiments of the present disclosure. One or more Blocks and/or functions and/or methods performed by the IoT device 12 and/or user WD 14 may be performed by one or more elements of IoT device 12 and/or user WD 14 such as by IDCM 18a, 18b (collectively, IDCM 18), processing circuitry 22, 30, memory 24, 32, processor 26, 34, communication interface 20, 28, etc. according to the example process/method. The example process includes registering (Block S100), by a first Session Initiation Protocol, SIP, client, with an Internet Protocol, IP, Multimedia communication Subsystem, IMS, network and waiting for incoming SIP calls (such as by IDCM 18, processing circuitry 22, 30, memory 24, 32, processor 26, 34 and/or communication interface 20, 28). The method includes answering (Block S102), by the first SIP client, an incoming SIP call from at least one authorized second SIP client associated with an Internet-of-Things, IoT, application (such as by IDCM 18, processing circuitry 22, 30, memory 24, 32, processor 26, 34 and/or communication interface 20, 28). The method includes after answering the incoming SIP call, negotiating (Block S104), such as via IDCM 18, processing circuitry 22, 30, memory 24, 32, processor 26, 34 and/or communication interface 20, 28, an IMS data channel for a plurality of predetermined endpoints associated with the IoT application.

In some embodiments, the method further includes creating, such as via IDCM 18, processing circuitry 22, 30, memory 24, 32, processor 26, 34 and/or communication interface 20, 28, a local endpoint at the wireless device for at least one of the plurality of predetermined endpoints associated with the IoT application; and after establishing the IMS data channel, using, such as via IDCM 18, processing circuitry 22, 30, memory 24, 32, processor 26, 34 and/or communication interface 20, 28, the local endpoint at the wireless device to exchange data over the IMS data channel.

In some embodiments, the local endpoint is one of a local identification-based network endpoint and a local publish-subscribe endpoint. In some embodiments, the method further includes sending, such as via IDCM 18, processing circuitry 22, 30, memory 24, 32, processor 26, 34 and/or communication interface 20, 28, incoming data from the local endpoint at the wireless device to the IMS data channel. In some embodiments, the method further includes using, such as via IDCM 18, processing circuitry 22, 30, memory 24, 32, processor 26, 34 and/or communication interface 20, 28, one of an identification and publish-subscribe topic associated with the local endpoint to determine a subchannel corresponding to the IMS data channel; and sending the incoming data from the local endpoint comprises sending, such as via IDCM 18, processing circuitry 22, 30, memory 24, 32, processor 26, 34 and/or communication interface 20, 28, the incoming data from the local endpoint to the determined subchannel.

In some embodiments, the method further includes sending, such as via IDCM 18, processing circuitry 22, 30, memory 24, 32, processor 26, 34 and/or communication interface 20, 28, incoming data from the IMS data channel to the local endpoint at the wireless device. In some embodiments, the method further includes using, such as via IDCM 18, processing circuitry 22, 30, memory 24, 32, processor 26, 34 and/or communication interface 20, 28, one of an identification and a publish-subscribe topic associated with the local endpoint to determine a subchannel corresponding to the IMS data channel; and sending the incoming data from the IMS data channel to the local endpoint comprises sending, such as via IDCM 18, processing circuitry 22, 30, memory 24, 32, processor 26, 34 and/or communication interface 20, 28, the incoming data from the determined subchannel to the local endpoint.

In some embodiments, the method further includes during the SIP call, listening, such as via IDCM 18, processing circuitry 22, 30, memory 24, 32, processor 26, 34 and/or communication interface 20, 28, for at least one control command from an endpoint associated with the second SIP client through the IMS data channel. In some embodiments, the method further includes dynamically adding, such as via IDCM 18, processing circuitry 22, 30, memory 24, 32, processor 26, 34 and/or communication interface 20, 28, at least one temporary endpoint involving re-negotiation of the IMS data channel. In some embodiments, the method further includes dynamically subtracting, such as via IDCM 18, processing circuitry 22, 30, memory 24, 32, processor 26, 34 and/or communication interface 20, 28, at least one temporary endpoint involving re-negotiation of the IMS data channel.

In some embodiments, the method further includes replicating, such as via IDCM 18, processing circuitry 22, 30, memory 24, 32, processor 26, 34 and/or communication interface 20, 28, a stream connection state from the remote endpoint. In some embodiments, the method further includes exchanging, such as via IDCM 18, processing circuitry 22, 30, memory 24, 32, processor 26, 34 and/or communication interface 20, 28, at least one of a current operation status and operational statistics over the IMS data channel with the second SIP client. In some embodiments, the plurality of predetermined endpoints comprises at least one of a transmission control protocol, TCP, endpoint, a user datagram protocol, UDP, endpoint and a WebSocket endpoint. In some embodiments, each of the plurality of predetermined endpoints corresponds to a subsystem associated with the wireless device. In some embodiments, a session description protocol, SDP, associated with the SIP call includes a media line indicating application.

In some embodiments, the method further includes determining, such as via IDCM 18, processing circuitry 22, 30, memory 24, 32, processor 26, 34 and/or communication interface 20, 28, a Quality-of-Service, QoS, associated with each endpoint of the plurality of predetermined endpoints; and using, such as via IDCM 18, processing circuitry 22, 30, memory 24, 32, processor 26, 34 and/or communication interface 20, 28, the determined QoS to negotiate and/or establish the IMS data channel. In some embodiments, the method further includes multiplexing, such as via IDCM 18, processing circuitry 22, 30, memory 24, 32, processor 26, 34 and/or communication interface 20, 28, data from a plurality of local endpoints at the wireless device and sending the multiplexed data over the IMS data channel. In some embodiments, the method further includes receiving, such as via IDCM 18, processing circuitry 22, 30, memory 24, 32, processor 26, 34 and/or communication interface 20, 28, multiplexed data from the IMS data channel, demultiplexing, such as via IDCM 18, processing circuitry 22, 30, memory 24, 32, processor 26, 34 and/or communication interface 20, 28, the received data and sending the demultiplexed data to a plurality of local endpoints at the wireless device. In some embodiments, the wireless device is an Internet-of-Things, IoT, device.

Having generally described arrangements for Interactive calling for IoT, a more detailed description of some of the embodiments are provided as follows with reference to FIGS. 4-8, and which may be implemented by WD 14, IoT device 12.

Some embodiments of the present disclosure may use an IMS data channel, such as the IMS Data Channel that may be specified in 3GPP Technical Specification (TS) 26.114. In some embodiments, the IMS data channel is used to allow the IoT device 12 connected to a mobile network to be controlled remotely. In some embodiments, the IoT device 12 may include an IMS Data Channel Manager (IDCM) 18 which includes a SIP client that registers itself toward the IMS as a SIP user and waits for incoming calls from e.g., authorized users, such as user WD 14 to e.g., remotely control/monitor the IoT device 12.

At the other end of the IMS data channel, an authorized user WD 14 or cloud-based application may use a similar SIP client IDCM 18 to register to the IMS and call the IoT device 12 in order to establish an IMS data channel with the IoT device 12. The established IMS data channel is then used to exchange data between the user/application at the user WD 14 and the IoT device 12.

Figure 4:
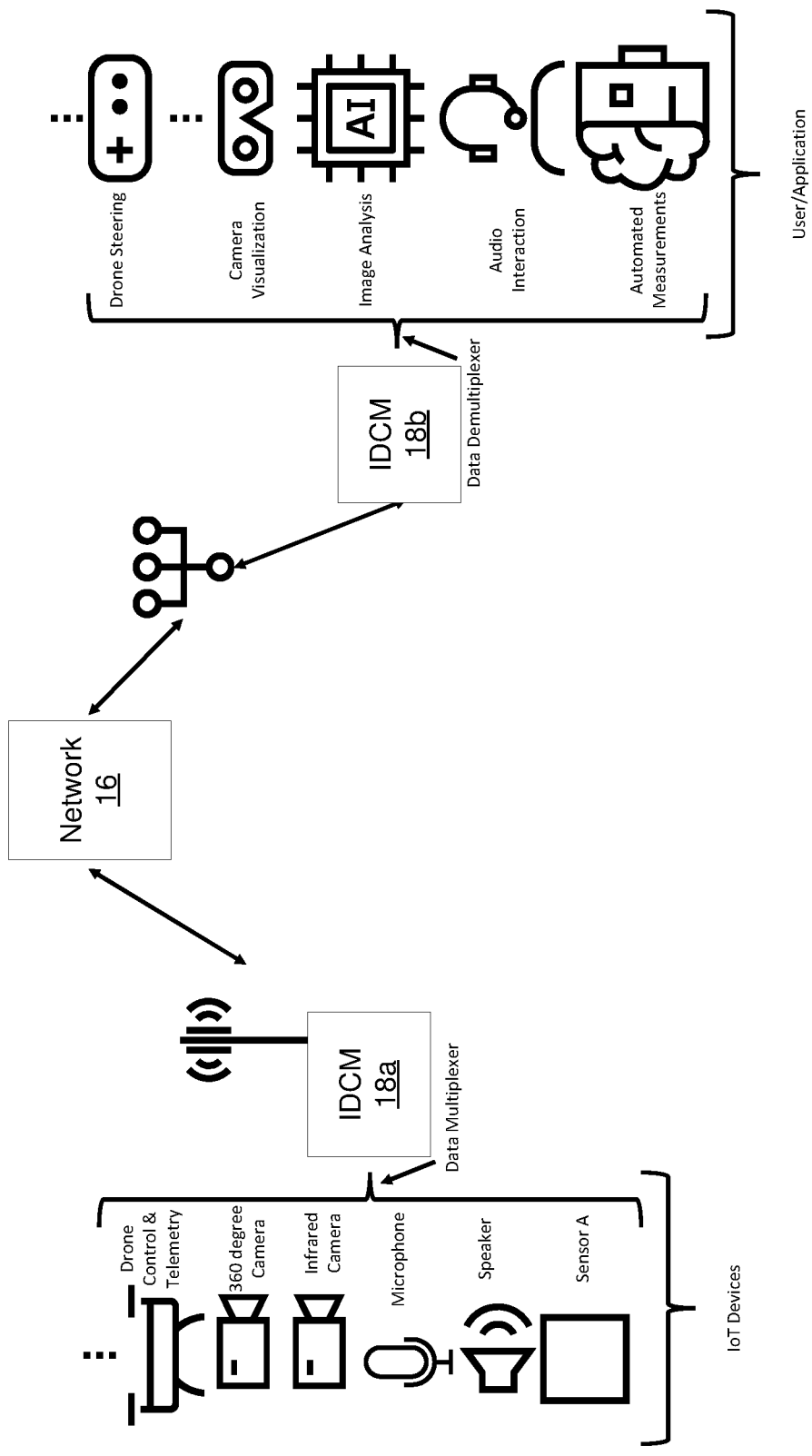
FIG. 4 illustrates an example use case of a drone built for inspecting structures such as bridges or overpasses according to some embodiments of the present disclosure.

The IDCM 18 running on both the IoT device 12 and the user/application may provide a number of local network connections called endpoints or local endpoints. The number of local endpoints may be predefined and/or based on the controlling application for the IoT device, such as, for example, a number defined by the IoT device and its controlling application requirements. In FIG. 4 for example, the number of local endpoints/local network connections is 6: one for each of drone control & telemetry, 360 degrees camera, infrared camera, microphone, speaker and sensor A. These endpoints can be UDP, TCP or WebSocket and may be used to interact with the various subsystems present on or accessed by the IoT device 12.

FIG. 4 shows an example use case of a drone built for inspecting structures such as bridges or overpasses. The drone (IoT device 12) is equipped with multiple sensors and communication devices that are used to perform a proper inspection. In order to use these devices/sensors, specialized software, that is either operated by the end-user (e.g., at the WD 14) or running in cloud-based servers, may be used and therefore use a direct access to said devices/sensors (IoT devices 12). In the example in FIG. 4, IDCM 18*a* (e.g., at IoT device 12) and IDCM 18*b* (e.g., at a user WD 14) may be able to establish a connection using respective user agents (UAs)/SIP clients and exchange data (e.g., multiplexed data) over the network 16 via one or more IMS data channels.

Some embodiments of the present disclosure provide a dedicated connection for each of these devices/sensors, which may imply a predictable way of establishing them.

The IoT device 12 may register to the IMS network using its SIP client at the IDCM 18 and then wait for incoming SIP calls. When an incoming SIP calls is answered, the local endpoints may be created by the IDCM 18 and may use the IMS data channels that are established when the user or cloud-based application (e.g., at the WD 14) calls the IoT device 12. If an IoT device 12 includes, for example, 6 networked sensors/cameras, 6 endpoints (e.g., predetermined endpoints) are to be configured (e.g., at the IDCM 18 on the IoT device 12), and the 6 configured endpoints will then be readily available when in call.

In some embodiments, the IoT device 12 has a known/predetermined/preset number of devices/sensors/peripherals that can be remotely controlled. The term 'predetermined' emphasizes this aspect. On the other hand, for the user WD 14 to access these known devices/sensors/peripherals, the user WD 14 should also be configured with a set of known devices/sensors/peripherals that can connect to their counterpart at the IoT device 12 (e.g., drone propellers connected to user's joystick for instance). Thus, a plurality of predetermined endpoints may be a list (or preset list) of known devices/sensors/peripherals at both IoT device 12 and user's WD 14.

In some embodiments, multiple different Quality of Service (QoS) profiles can be used (e.g., to accommodate the different QoS for different local endpoints, for example, video such as the 360 degree camera data may have different QoS than drone control or sensor A) by establishing multiple IMS data channels, each IMS data channel may have its own QoS profile and mapping to the endpoints accordingly. In this example, data from the 360 degrees camera could be carried with a high bandwidth QoS while data for the drone control could use a very low latency QoS. Some embodiments of such a feature may advantageously provide QoS differentiation between the IMS data channels and the endpoints may then be mapped to the appropriate IMS data channel.

The drone (IoT device 12) and all its peripherals are on the left and the user applications controlling the drone are on the right side of FIG. 4. Note that since the IMS network can be accessible via the Internet or another type of network, the user/application may register to IMS without being connected to a mobile network or fixed telecommunication network. The IMS data channel may be used as a pipe carrying all the traffic between the IoT device 12 and the user/application at the WD 14 (or in the cloud).

Figure 5:
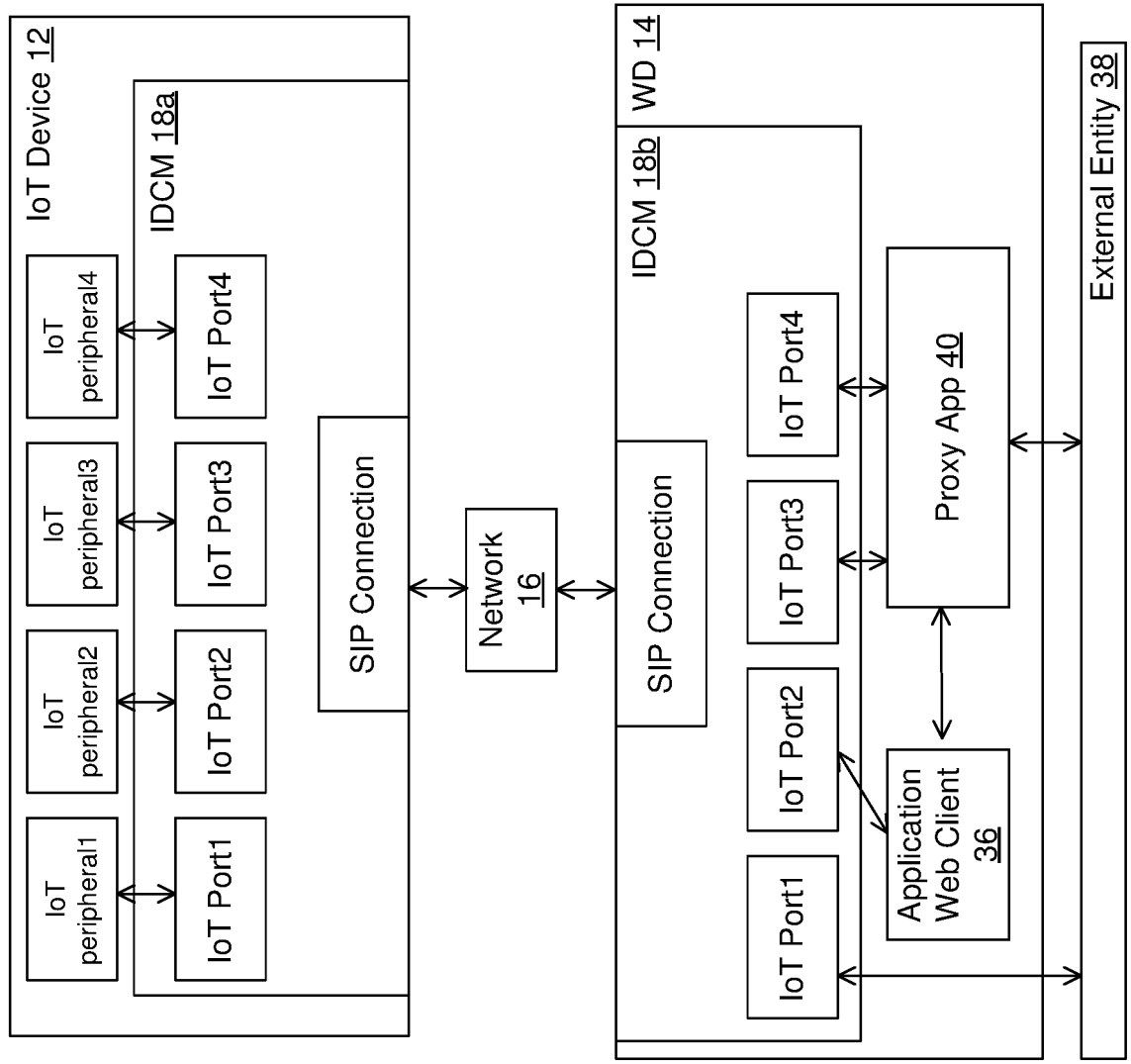
FIG. 5 illustrates an example arrangement including an IoT device and an external entity, such as a user WD according to some embodiments of the present disclosure.

FIG. 5 illustrates an example arrangement of a typical use case that allows an application web client 36 at a user WD 14 to control a remote IoT device 12 by e.g., respective IDCMs 18b and 18a providing a set of IoT ports, each IoT port being associated with a particular IoT peripheral (e.g., IoT peripherals 1-4, which may be for example, a camera, a drone control, a microphone and a sensor). Although the drone scenario is used as an example in the present disclosure, it should be understood that the IoT scenario is not limited to drone-related IoT, which is merely used as an illustrative example. The FIG. 5 example arrangement includes the IoT device 12, an external entity 38 and the user WD 14 running a proxy application 40. The proxy application 40, the application web client 36 and/or the external entity 38 are not mandatory for all embodiments of the present disclosure; the IoT application's designer may implement the features as he/she sees fit based on the particular IoT scenario. The external entity 38 may be considered an entity that can benefit from at least a portion of the IoT data, such as telemetry or the processed information from the proxy application 40.

As shown in FIG. 5, the IDCM 18 may include a plurality of IoT ports, such as IoT ports 1-4 for communications between the different elements, applications, peripherals, devices, etc. associated with the IoT system/device. In the example arrangement, IoT ports 3 and 4 are used to communicate with the proxy application while IoT ports 1 and 2 are used for communications with the external entity 38 and the application web client 36.

Figure 6:
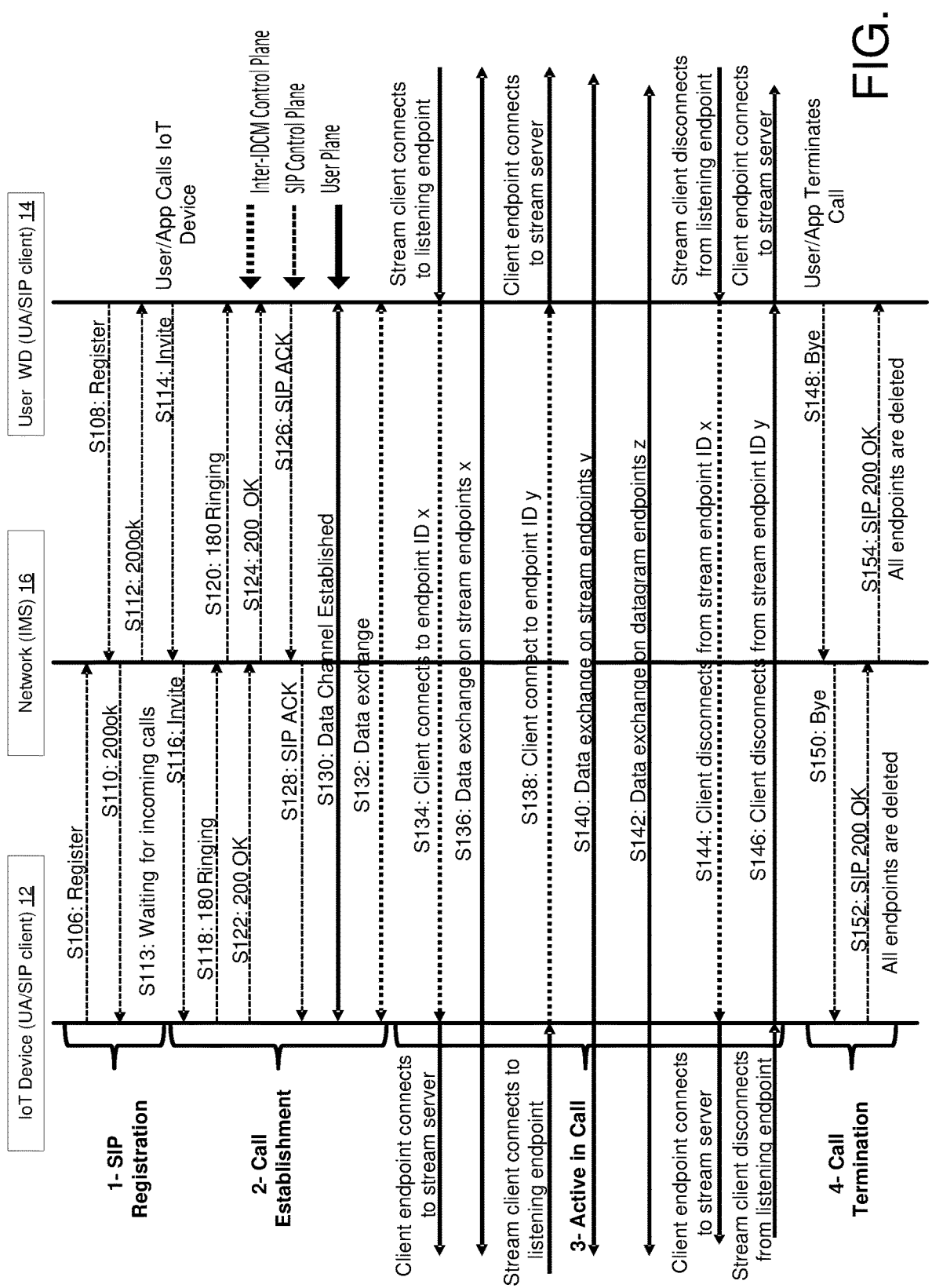
FIG. 6 is a flowchart illustrating the various events/signaling (control plane as well as in the user plane) at the IoT device according to some embodiments of the present disclosure.

FIG. 6 is a flowchart illustrating an example of the various events/signaling (control plane as well as in the user plane) at the IoT device 12 and particularly, in the SIP client at the IDCM 18. In some embodiments, generally, the first step is the SIP registration with the IMS network; the second step is the call establishment between IoT device 12 and WD 14; the third step is the active in call data exchange with examples of stream (TCP) connect/disconnect events; and the last step is the call termination, as shown in FIG. 6.

1-SIP Registration: In steps S106 and S108, IoT device 12 and WD 14 registers to IMS. In steps S110 and S112, IoT device 12 and WD 14 receives a 200 OK SIP message that confirms IMS registration. The IoT device 12 then waits for any incoming calls at step S113.

It should be noted that the predetermined endpoints associated with the particular IoT device 12 may be provisioned/pre-configured at the IoT device and WD 14 prior to SIP registration (e.g., the information identifying the predetermined endpoints may be provisioned at the IDCM 18, which may be aware that there are, for example, 6 particular sensors/peripherals associated with the IoT device 12); but the local endpoints may not actually exist until the call is actually in progress between both ends of the call. Thus, in some embodiments, creation of the local endpoints may occur only after the IoT device 12 answers the call from the user WD 14.

Tailoring/provisioning an endpoint to an application (in other words, a tailored endpoint or a predetermined endpoint), may mean that the IP address, the transport protocol (UDP/TCP/WebSocket) and the port are defined for the predetermined endpoint. For example, the port may be defined as a server or a client port, the usage of the endpoint may be defined (e.g., generic versus real-time streaming protocol (RTSP) protocol) and how the endpoint is tied to one or more of its remote counterpart endpoints may be defined (e.g., with ID-based network versus pub-sub endpoint correlation).

2-Call Establishment: In steps S114 and S116, the user WD 14 sends a SIP invite message towards the IoT device 12. In Steps S118 and S120, the IoT device 12 sends a 180 ringing SIP message towards the user WD 14. In steps S122 and S124, the IoT device 12 sends a 200 OK SIP message towards the user WD 14. In steps S126 and S128, a SIP acknowledgement (ACK) message is sent from the user WD 14 towards the IoT device 12. In step S130, the IMS data channel may then be established and in step S132, data may be exchanged between IoT device 12 and WD 14 over network 16, e.g., periodic exchange of relevant data, such as for example local telemetry may start.

3-Active in call: In step S134, a local endpoint x (e.g., for video data) at the IoT device 12 may connect to a corresponding endpoint at the WD 14 and in step S136, data may be exchanged between the endpoints. In step S138, a local endpoint y (e.g., for audio data) at the IoT device 12 may connect to a corresponding endpoint at the WD 14 and in step S140, data may be exchanged between the endpoints. In step S142, data may be exchanged between local endpoint z (e.g., for sensor A data) at the IoT device 12 and a corresponding endpoint at the WD 14.

4-Call Termination: In steps S144 and S146, there may be a disconnection of endpoints x and y. In steps S148 and S150, the user WD 14 may terminate the call which may cause the SIP client to send a Bye SIP message towards the IoT device 12. In steps S152 and S154, the IoT device 12 may then send a SIP 200 OK message toward the user WD 14. All the associated endpoints may then be deleted, and the call termination is complete.

In some embodiments, the session description protocol (SDP) in the SIP signaling may include one or more entries with the 'm-line' (media line) set as 'application', which may indicate that the data is being exchanged via an IMS data channel. Other m-lines with audio and/or video could be present in the SDP content, but may not be present.

Some embodiments of the present disclosure may advantageously allow IDCMs 18 on both ends to be connected. Network endpoints are identified by numerical identifiers IDs (thus, they may also be called ID-based network endpoints). A network endpoint with the same ID must be present on both sides to allow data continuity for network endpoint type connections. A user datagram protocol (UDP) endpoint may be used for unidirectional data, such as basic sensor or audio/video, and may be duplicated to more than one destination endpoint by allocating such destination endpoints with the same ID (e.g., a specialized sensor may be associated with a unidirectional UDP stream where sensor data may be sent to an Artificial Intelligence (AI) component for analysis and to a proxy application for reporting to the user WD 14).

An ID-based network endpoint is identified by a unique numerical ID that is not related to an IP address or port number. The endpoint itself uses an IP address, transport protocol (e.g., TCP, UDP or WebSocket) and a port number. The ID is used to attach the local endpoint to the remote endpoint so that traffic/data can pass between the two endpoints. Network endpoints with the same ID are connected to each other. Network endpoints that do not have the same ID are not connected to each other.

In some embodiments, the endpoints may be publish-subscribe (pub-sub) type endpoints, rather than network ID-based endpoints. The pub-sub endpoints are handled differently. Pub-sub endpoints publish their data to the other end of the connection using a topic. Pub-Sub endpoints on the other end must subscribe to this topic in order to receive the data. For example, a first endpoint may publish on a 'x' topic that is subscribed by the proxy application. In another direction, a second endpoint publishes commands on a 'y' topic and the proxy application publishes call control on a 'control' topic. Multiple endpoints may subscribe to multiple topics. The difference between pub-sub endpoints and ID-based network endpoints is how the local and remote pub-sub endpoints are connected to each other. With ID-based network endpoints, the endpoint ID must match; whereas with pub-sub endpoints, the endpoint's subscription topic must match the counterpart endpoint's publish topic. Thus, a publish-subscribe model is used, rather than an ID-matching model.

Figure 7:
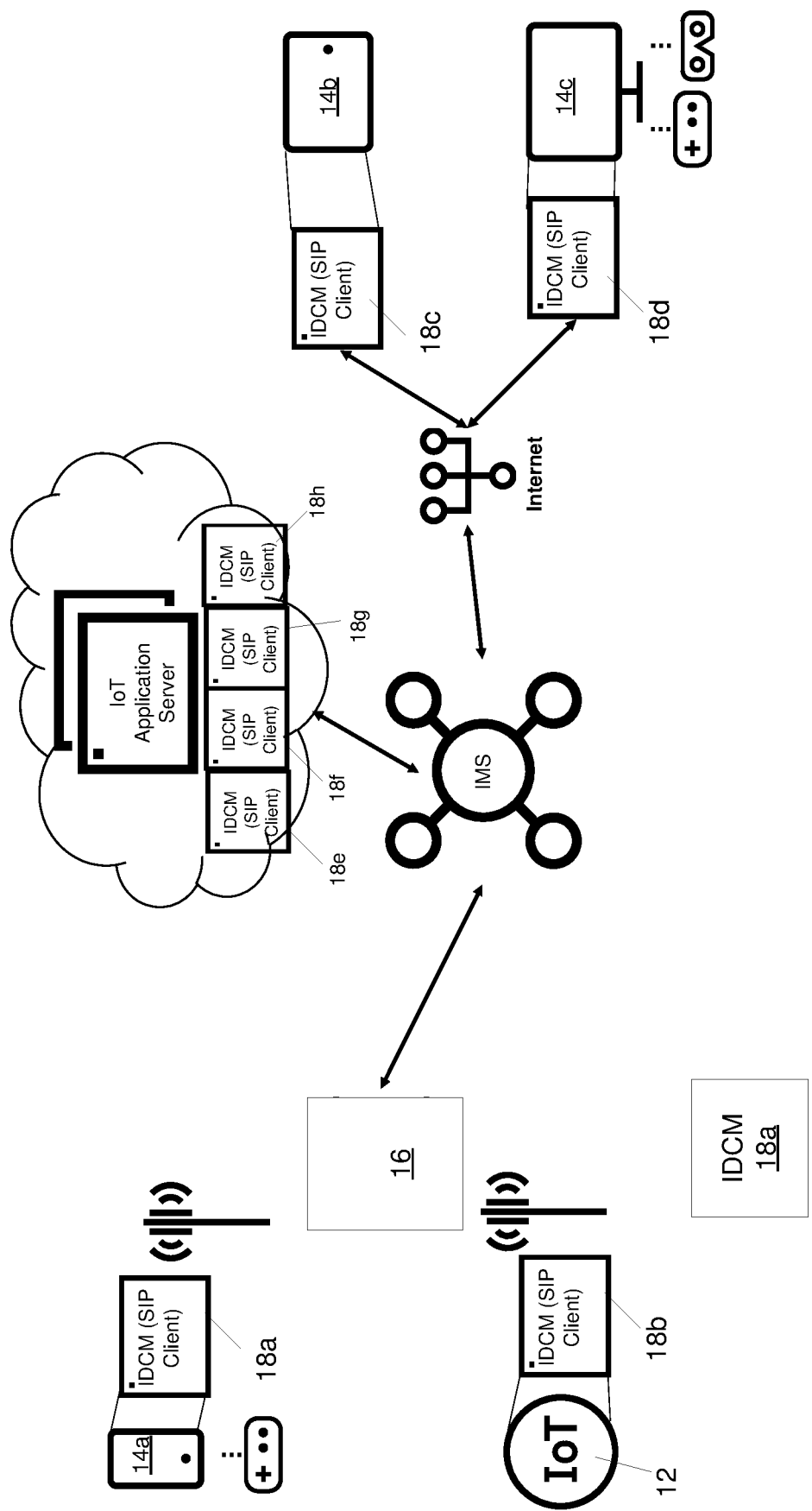
FIG. 7 illustrates an example IoT model that may be extended to more than two user WDs and may be implemented using a cloud environment according to some embodiments of the present disclosure.

In some embodiments, the IDCM 18 may be used in a point-to-point configuration where the IMS data channel may be used as a single pipe to connect two entities (e.g., the user/application at WD 14 and the drone IoT device 12). FIG. 7 illustrates an example IoT model that may be extended to more than two users. For example, an IoT device 12 including the IDCM's 18b SIP client may be configured with multiple endpoints to connect to IDCMs' 18a, 18c, 18d SIP clients at multiple different user WDs 14a-c. Some embodiments may leverage the multi-party capabilities of the IMS network and use, for example, a conferencing call model where participants may be added and removed on-the-fly.

One example with the drone is a use case where the pilot, not having the proper qualifications, requests the advice of an expert while performing an inspection. The pilot and expert may use the drone in different ways; the pilot may be the only one licensed to fly the drone, while the expert has the proper knowledge to use a specific sensor and interpret the data such sensor produces. Other experts could be added as well depending on the type of the inspection. The resulting IoT application may provide each user WD 14 specific control over the IoT device 12 based on their specific role (e.g., pilot or expert in this case). For example, the pilot's WD e.g., WD 14a may be able to provide commands (e.g., via a specific configured endpoint at pilot's WD e.g., 14a for command data) to control the flight of the drone, while the expert's WD e.g., 14c may be able to receive sensor data (e.g., via specific configured endpoint at expert's WD 14c for sensor data).

FIG. 7 further illustrates how such an application could be implemented in a cloud architecture. The IMS may be used to establish the multi-party call while the IMS data channel is routed to an IoT application server located in the cloud, which may be associated with IDCMs 18e-h in the cloud. Because the information transported in the IMS data channel is specific to the application being served, it may be useful to have an external application server tailored to the application. The application may then use the data from the IoT device 12. In some embodiments, a point-to-point configuration, as described above, can also be implemented with such a cloud architecture.

Figure 8:
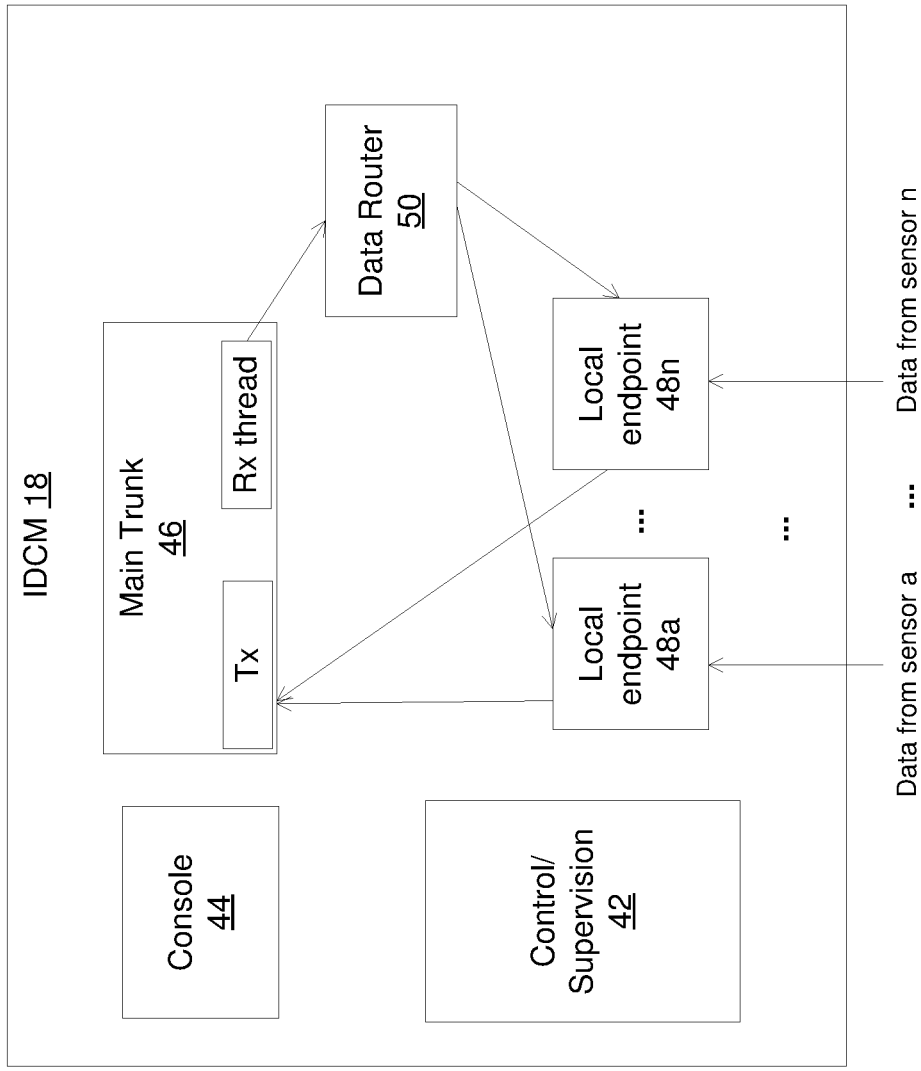
FIG. 8 is a schematic diagram illustrating an example arrangement of the IDCM according to some embodiments of the present disclosure.

FIG. 8 is a schematic diagram illustrating an example arrangement of the IDCM 18. In the example, the IDCM 18 includes a control and supervision module 42, a console 44, a main trunk 46 and a plurality of local endpoints 48a-n, where n can be any number greater than 1. For example, 3 local identification-based network endpoints and 3 local publish-subscribe endpoints corresponding to a preset list of 6 endpoints may be e.g., created upon answering a SIP call. Data from 6 different sensors/devices/peripherals associated with the IoT device 12 (e.g., drone from FIG. 4) may then be received by the respective local endpoints 48 and sent to the main trunk 46 for transmission (Tx) over the IMS data channel that was established e.g., via IMS registration and SIP call described above.

In the other communication direction, data from the user application at the WD 14 may be received (e.g., via a receiver/Rx thread) by the main trunk 46 over the IMS data channel. The IDCM 18 may further include a data router 50 which may include, for example, a routing table and may be configured to e.g., use the routing table to route the received data to the corresponding local endpoints 48. In some embodiments, the main trunk 46 may be configured to de-multiplex the received data before routing the specific data stream to the respective local endpoints 48.

In terms of multiplexing, in some embodiments, the main trunk 46 may multiplex the data from the different local endpoints and transmit the multiplexed data over a single IMS data channel. In some embodiments, there may not be data for all the endpoints for a particular data exchange; thus, data from less than all 6 sensors/devices and respective local endpoints 48 may be multiplexed and sent over the IMS data channel. In some embodiments, the data may be multiplexed per QoS profile (e.g., data with the same QoS profile may be multiplexed together and sent together over the IMS data channel associated with such QoS profile).

Data associated with each of the sensors/devices/peripherals may be considered to correspond to respective subchannels (e.g., data to be routed to drone control's local endpoint may correspond to a particular subchannel, while data from a sensor's local endpoint may correspond to another particular subchannel). Such subchannels may be used to perform the multiplexing of the different data. The local endpoint's specification may include its ID-based ID or pub-sub publishing topic and subscription topics, which ID/topics may be used to determine the particular subchannel that the data belongs to. In the case of ID-based endpoints, the ID may be used directly to determine the subchannel to be used. In the case of pub-sub endpoints, each topic (found in the preset/predetermined list of pub-sub endpoints) may be assigned a subchannel (different from ID-based endpoints) during the call establishment negotiation.

In some embodiments, additional endpoints may be dynamically added and subtracted on-the-fly. For example, during a call certain protocols (such as RTSP used to transport audio and video) may use add additional endpoints on-the-fly when media is played. These endpoints may be temporary and will not be recreated at the next call. Thus, in some embodiments, these endpoints may be dynamically added and subtracted on-the-fly. To ensure both parties/ends of the call use the appropriate subchannel(s), a re-negotiation of the IMS data channel may be performed.

Some embodiments may provide an IMS data channel connection feature that allows a real-time communication device with low computing resources such as the IoT device 12, which may be associated with one or more networked sensors/devices to efficiently utilize a secure connection e.g., over the IMS network, that may be always available as long as it has a connection to the public insecure Internet and/or a mobile network (e.g., 5G). The security features of the IMS may thus be leveraged by some embodiments of the present disclosure to enable a secure access to the IoT device 12 and also provide QoS for the data exchange. The SIP client may provide the connectivity between both ends, which may be easily tailored to the IoT application by e.g., IoT application designers.

Some embodiments provide connectivity simplicity that allows the IoT application designers to focus on the actual IoT application. For example, some embodiments of the IDCM 18 are configured to handle the IMS signaling (e.g., to register to IMS via SIP signalling, wait for any incoming SIP calls and upon answering an incoming SIP call, negotiate and establish an IMS data channel for one or more predetermined endpoints associated with the IoT device) while also providing network endpoints flexibility and configurable QoS. Some embodiments may provide that the IoT application designer may be freed to merely define the endpoints specifications and how to use them.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device comprising a first Session Initiation Protocol, SIP, client, the method comprising:

registering, by the first SIP client, with an Internet Protocol, IP, Multimedia communication Subsystem, IMS, network and waiting for incoming SIP calls;

answering, by the first SIP client, an incoming SIP call from at least one authorized second SIP client associated with an Internet-of-Things, IoT, application;

after answering the incoming SIP call, negotiating an IMS data channel for a plurality of predetermined endpoints associated with the IoT application;

creating a local endpoint at the wireless device for at least one of the plurality of predetermined endpoints associated with the IoT application;

after establishing the IMS data channel, using the local endpoint at the wireless device to exchange data, over the IMS data channel, with the at least one of the plurality of predetermined endpoints associated with the IoT application; and one or more of:

during the incoming SIP call, listening for at least one control command from an endpoint associated with the at least one authorized second SIP client through the IMS data channel;

dynamically adding at least one temporary endpoint involving re-negotiation of the IMS data channel; and dynamically subtracting the at least one temporary endpoint involving re-negotiation of the IMS data channel.

2. The method of claim 1, wherein the local endpoint is one of a local identification-based network endpoint and a local publish-subscribe endpoint.

3. The method of claim 1, further comprising:
sending incoming data from the local endpoint at the wireless device to the IMS data channel;
using one of an identification and publish-subscribe topic associated with the local endpoint to determine a subchannel corresponding to the IMS data channel; and
wherein sending the incoming data from the local endpoint comprises sending the incoming data from the local endpoint to the determined subchannel.

4. The method of claim 1, further comprising:
sending incoming data from the IMS data channel to the local endpoint at the wireless device;
using one of an identification and a publish-subscribe topic associated with the local endpoint to determine a subchannel corresponding to the IMS data channel; and
wherein sending the incoming data from the IMS data channel to the local endpoint comprises sending the incoming data from the determined subchannel to the local endpoint.

5. The method of claim 1, further comprising:
replicating a stream connection state from a remote endpoint.

6. The method of claim 1, further comprising:
exchanging at least one of a current operation status and operational statistics over the IMS data channel with the at least one authorized second SIP client.

7. The method of claim 1, wherein a session description protocol, SDP, associated with the incoming SIP call includes a media line indicating application.

8. The method of claim 1, further comprising:
determining a Quality-of-Service, QoS, associated with each endpoint of the plurality of predetermined endpoints; and
one or both using the determined QoS to negotiate and establishing the IMS data channel.

9. The method of claim 1, further comprising one or both of:
multiplexing data from a plurality of local endpoints at the wireless device and sending the multiplexed data over the IMS data channel; and
receiving multiplexed data from the IMS data channel, demultiplexing the received data and sending the demultiplexed data to the plurality of local endpoints at the wireless device.

10. A wireless device comprising a first Session Initiation Protocol, SIP, client and processing circuitry, the processing circuitry being in communication with the first SIP client and configured to cause the wireless device to:
register, by the first SIP client, with an Internet Protocol, IP, Multimedia communication Subsystem, IMS, network and wait for incoming SIP calls;
answer, by the first SIP client, an incoming SIP call from at least one authorized second SIP client associated with an Internet-of-Things, IoT, application;
after answering the incoming SIP call, negotiate an IMS data channel for a plurality of predetermined endpoints associated with the IoT application;

create a local endpoint at the wireless device for at least one of the plurality of predetermined endpoints associated with the IoT application;
after establishing the IMS data channel, use the local endpoint at the wireless device to exchange data, over the IMS data channel, with the at least one of the plurality of predetermined endpoints associated with the IoT application; and
one or more of:
during the incoming SIP call, listen for at least one control command from an endpoint associated with the at least one authorized second SIP client through the IMS data channel;
dynamically add at least one temporary endpoint involving re-negotiation of the IMS data channel; and
dynamically subtract the at least one temporary endpoint involving re-negotiation of the IMS data channel.

11. The wireless device of claim 10, wherein the local endpoint is one of a local identification-based network endpoint and a local publish-subscribe endpoint.

12. The wireless device of claim 10, wherein the processing circuitry is configured to cause the wireless device to:
send incoming data from the local endpoint at the wireless device to the IMS data channel;
use one of an identification and publish-subscribe topic associated with the local endpoint to determine a subchannel corresponding to the IMS data channel; and
send the incoming data from the local endpoint by being configured to cause the wireless device to send the incoming data from the local endpoint to the determined subchannel.

13. The wireless device of claim 10, wherein the processing circuitry is configured to cause the wireless device to:
send incoming data from the IMS data channel to the local endpoint at the wireless device;
use one of an identification and a publish-subscribe topic associated with the local endpoint to determine a subchannel corresponding to the IMS data channel; and
send the incoming data from the IMS data channel to the local endpoint by being configured to cause the wireless device to send the incoming data from the determined subchannel to the local endpoint.

14. The wireless device of claim 10, wherein the processing circuitry is configured to cause the wireless device to:
replicate a stream connection state from a remote endpoint.

15. The wireless device of claim 10, wherein the processing circuitry is configured to cause the wireless device to:
exchange at least one of a current operation status and operational statistics over the IMS data channel with the at least one authorized second SIP client.

16. The wireless device of claim 10, wherein a session description protocol, SDP, associated with the incoming SIP call includes a media line indicating application.

17. The wireless device of claim 10, wherein the processing circuitry is further configured to cause the wireless device to:
determine a Quality-of-Service, QoS, associated with each endpoint of the plurality of predetermined endpoints; and
one or both use the determined QoS to negotiate and establish the IMS data channel.

18. The wireless device of claim 10, wherein the processing circuitry is configured to cause the wireless device to one or both:

multiplex data from a plurality of local endpoints at the wireless device and send the multiplexed data over the IMS data channel; and receive multiplexed data from the IMS data channel, demultiplexing the received data and sending the demultiplexed data to the plurality of local endpoints at the wireless device.

19. A non-transitory storage medium storing an executable computer program comprising computer instructions executable by at least one processor to perform a method, the method comprising:

registering, by a first Session Initiation Protocol, SIP, client, with an Internet Protocol, IP, Multimedia communication Subsystem, IMS, network and waiting for incoming SIP calls;

answering, by the first SIP client, an incoming SIP call from at least one authorized second SIP client associated with an Internet-of-Things, IoT, application;

after answering the incoming SIP call, negotiating an IMS data channel for a plurality of predetermined endpoints associated with the IoT application;

creating a local endpoint at the wireless device for at least one of the plurality of predetermined endpoints associated with the IoT application;

after establishing the IMS data channel, using the local endpoint at the wireless device to exchange data, over the IMS data channel, with the at least one of the plurality of predetermined endpoints associated with the IoT application; and one or more of:

during the incoming SIP call, listening for at least one control command from an endpoint associated with the at least one authorized second SIP client through the IMS data channel;

dynamically adding at least one temporary endpoint involving re-negotiation of the IMS data channel; and dynamically subtracting the at least one temporary endpoint involving re-negotiation of the IMS data channel.

* * * * *